US012792943B2

(12) United States Patent
Klimov

(10) Patent No.: US 12,792,943 B2
(45) Date of Patent: Nov. 10, 2026

(54) SYSTEMS AND METHODS FOR EVALUATING SCALABILITY OF QUANTUM COMPUTING SYSTEMS

(71) Applicant: Google LLC, Mountain View, CA (US)

(72) Inventor: Paul Victor Klimov, Santa Barbara, CA (US)

(73) Assignee: GOOGLE LLC, Mountain View, CA (US)

( * ) Notice: Subject to any disclaimer, the term of this patent is extended or adjusted under 35 U.S.C. 154(b) by 620 days.

(21) Appl. No.: 18/364,305

(22) Filed: Aug. 2, 2023

(65) Prior Publication Data

US 2026/0099742 A1 Apr. 9, 2026

(51) Int. Cl.
*G06N 10/20* (2022.01)

(52) U.S. Cl.
CPC .................................... *G06N 10/20* (2022.01)

(58) Field of Classification Search
None
See application file for complete search history.

(56) References Cited

U.S. PATENT DOCUMENTS

| | | | | |
|---|---|---|---|---|
| 10,692,009 | B2 | 6/2020 | Kelly | |
| 11,556,813 | B2 | 1/2023 | Klimov et al. | |
| 11,567,842 | B2 | 1/2023 | Kelly | |
| 11,699,088 | B2 | 7/2023 | Klimov | |
| 11,816,535 | B1 | 11/2023 | Satzinger et al. | |
| 11,829,844 | B2 | 11/2023 | Klimov et al. | |
| 2020/0327441 | A1* | 10/2020 | Cao | G06N 10/60 |
| 2020/0394524 | A1 | 12/2020 | Vainsencher et al. | |
| 2022/0300847 | A1 | 9/2022 | Klimov et al. | |
| 2022/0309373 | A1* | 9/2022 | Huang | G06N 10/00 |
| 2022/0391742 | A1* | 12/2022 | Amaro | G06N 10/60 |
| 2023/0029092 | A1 | 1/2023 | Klimov | |

(Continued)

OTHER PUBLICATIONS

Erhard et al., “Characterizing large-scale quantum computers via cycle benchmarking”, arXiv:1902.08543v1, Feb. 22, 2019, 13 pages.

(Continued)

*Primary Examiner* — Kaveh Abrishamkar
(74) *Attorney, Agent, or Firm* — DORITY & MANNING P.A.

(57) ABSTRACT

Systems and methods for evaluating the scalability of quantum systems are provided. In one example, a method may include obtaining benchmark performance data for a candidate quantum system architecture. The benchmark performance data may be descriptive of one or more performance characteristics of the candidate quantum system architecture for a plurality of processor sizes. The method may include obtaining one or more scaling parameters based on the benchmark performance data, including a quantum scaling model relating processor size of the candidate quantum system architecture to the one or more performance characteristics. The method may include determining one or more scaling metrics for the candidate quantum system architecture at a scaled processor size greater than the plurality of processor sizes by the quantum scaling model. The method may include determining one or more control actions for an operational quantum system based on the one or more scaling metrics.

20 Claims, 7 Drawing Sheets

(56) References Cited

U.S. PATENT DOCUMENTS

| | | | | |
|---|---|---|---|---|
| 2023/0259802 | A1 | 8/2023 | Klimov et al. | |
| 2023/0359922 | A1 * | 11/2023 | Klimov .................. | G06N 10/60 |
| 2024/0403688 | A1 * | 12/2024 | van den Berg ........ | G06N 10/20 |

OTHER PUBLICATIONS

Hashim et al., "Randomized compiling for scalable quantum computing on a noisy superconducting quantum processor", arXiv:2010.00215v1, Oct. 1, 2020, 18 pages.
International Search Report and Written Opinion for Application No. PCT/US2024/035351, mailed Jan. 9, 2026, 17 pages.
International Preliminary Report on Patentability for Application No. PCT/US2024/035351, mailed Feb. 12, 2026, 10 pages.

* cited by examiner

SYSTEMS AND METHODS FOR EVALUATING SCALABILITY OF QUANTUM COMPUTING SYSTEMS

FIELD

The present disclosure relates generally to systems and methods for evaluating scalability of quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as $a|0\rangle + b|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a method for evaluating scalability of quantum systems. The method may include obtaining benchmark performance data for a candidate quantum system architecture. The benchmark performance data may be descriptive of one or more performance characteristics of the candidate quantum system architecture for a plurality of processor sizes of the candidate quantum system architecture. The method may include obtaining one or more scaling parameters based on the benchmark performance data. The one or more quantum scaling parameters may include a quantum scaling model relating processor size of the candidate quantum system architecture to the one or more performance characteristics of the candidate quantum system architecture. The method may include determining one or more scaling metrics for the candidate quantum system architecture at a scaled processor size greater than the plurality of processor sizes by the quantum scaling model. The method may include determining one or more control actions for an operational quantum system based on the one or more scaling metrics.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
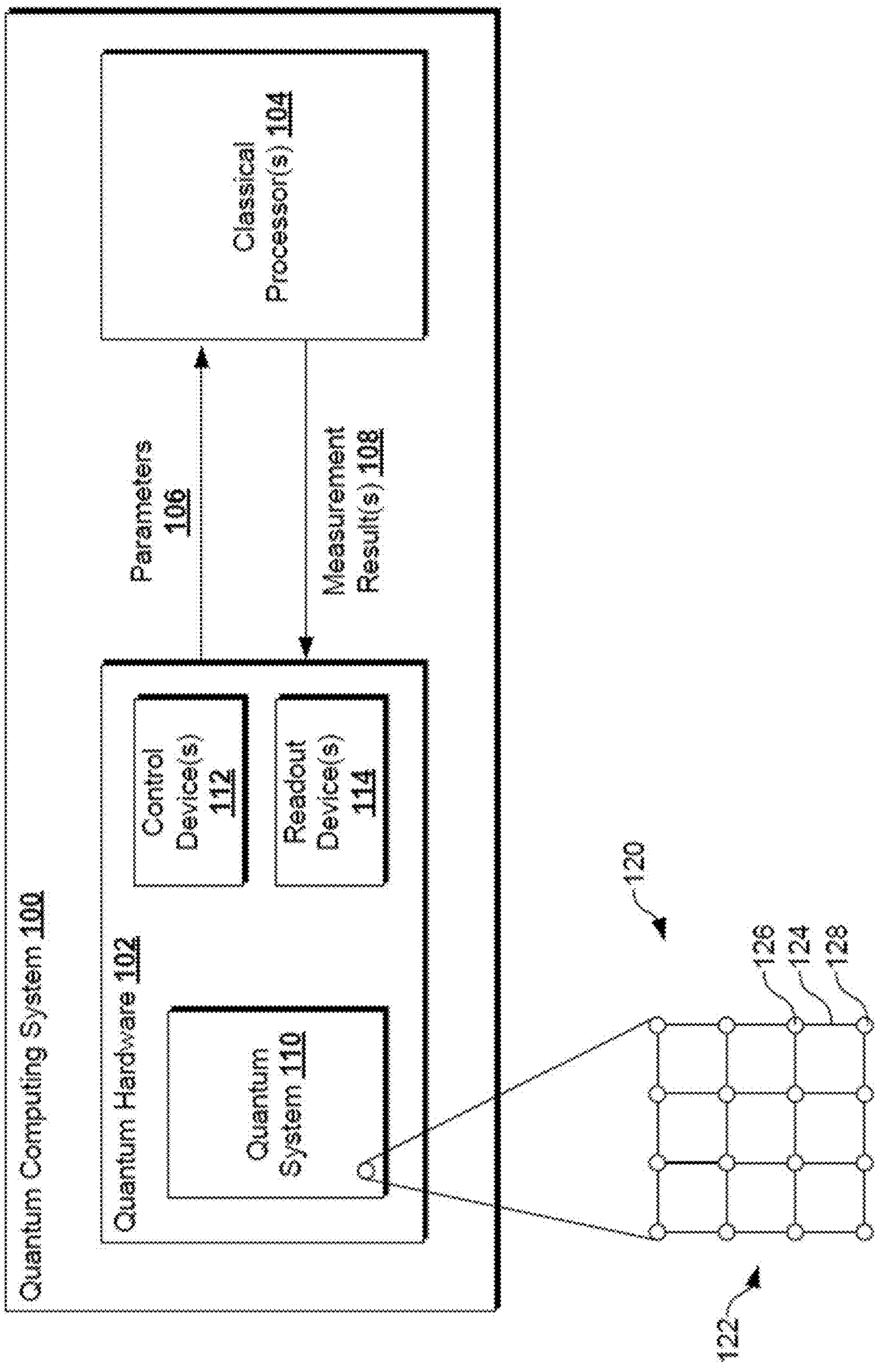
FIG. 1 depicts an example of a quantum computing system according to example aspects of the present disclosure.

Example embodiments according to some aspects of the present disclosure are directed to systems and methods for evaluating scalability of quantum computing systems. Evaluating the scalability of a quantum computing system, which can typically include a quantum processor configured according to an architecture and control system, may be nontrivial. For instance, building larger quantum systems to measure performance of those systems at scales including tens, hundreds, or even thousands of qubits can be costly and/or infeasible. For this reason, it can be beneficial to simulate or construct smaller-scale quantum systems and extrapolate performance of larger quantum systems from those smaller-scale quantum systems.

However, it can be challenging to extrapolate the performance of large systems from relatively smaller systems, as progressively larger quantum systems can suffer from progressively increasing sources of degradation. For instance, hardware architectures and/or control sources can both contribute degradation to quantum operations as quantum systems increase in scale. As an example, hardware systems can suffer increased control crosstalk, where one qubit control line weakly couples to another qubit, which can lead to control errors. Additionally or alternatively, hardware systems can suffer increased quantum crosstalk, such as frequency collisions and/or qubit parasitic coupling, which can lead to control errors such as swap, phase, and/or leakage errors. Additionally or alternatively, hardware systems can suffer from increased fabrication inhomogeneities, which can lead to qubit circuit parameter variations such as variations in maximum frequencies, flux-susceptibilities, and/or other qubit circuit parameters. Furthermore, the distinction between different sources of error sources may not always be clearly determinable due to complex interplay between various components.

Additionally, it can be difficult to control larger quantum systems, as progressively scaling quantum systems can lead to typically exponentially more frequency configurations and typically linearly more frequency constraints, which can be computationally intractable to optimize. Furthermore, larger quantum systems can experience more catastrophic performance outlier gates due to drift during calibration. For instance, two-level-system (TLS) defect frequency transitions can fluctuate into the path of gate frequency trajectories. Furthermore, larger systems can experience higher susceptibility to constraint propagation across a processor. For example, a single anomalous frequency constraint or performance outlier may degrade several nearby gates. As one particular example, a single qubit with an anomalously low maximum frequency can "pull down" surrounding qubits in frequency to minimize frequency excursions during two-qubit gates. This can contribute to dephasing on those surrounding qubits.

The present inventors have discovered that it is not presently feasible to extrapolate the scalability of a quantum computing system by measuring performance metrics in a system of fixed size due to these complex sources of degradation as quantum systems scale in size. To solve these problems, the present disclosure provides systems and methods for evaluating the scalability of a quantum computing system architecture (e.g., quantum hardware architecture and/or control strategy) based on benchmark performance measurements of progressively larger quantum systems according to the quantum computing system architecture. For instance, aspects of the present disclosure can utilize scalability models that can model performance of quantum computing system architectures accurately at large scales, such as scales for implementing practical quantum algorithms (e.g., scales on the order of several tens of qubits or hundreds of qubits). Furthermore, determining the scalability models can be performed with data from real or simulated quantum systems at a significantly smaller scale than scales for implementing practical quantum algorithms, such as scales on the order of ten or fewer qubits. In this manner, it can be possible to evaluate the scalability of a given quantum computing system architecture at large scales without constructing an operational quantum computing system at those large scales.

A quantum computing system architecture (or quantum system architecture) can define hardware architecture or process architecture and control strategy. The hardware architecture can specify, describe, or otherwise represent structural characteristics of the quantum computing system, such as qubits of the quantum computing system. For instance, one example hardware architecture may define frequency-tunable superconducting transmon qubits. Additionally or alternatively, a hardware architecture may define ion qubits, neutral atom qubits, photon qubits, semiconductor defect qubits, quantum dots, and so on. The hardware architecture may also define structural characteristics such as qubit type characteristics (e.g., defining a type of qubit), qubit arrangement characteristics (e.g., defining an arrangement of one or more qubits), control signal line arrangement characteristics (e.g., defining arrangements of one or more control signal lines coupled to the one or more qubits), fabrication characteristics, and/or dependency characteristics (e.g., defining known dependencies between multiple qubits). Furthermore, the control strategy can specify, describe, or otherwise represent operational characteristics of the quantum system, such as, for example, operating frequencies, optimizations, calibration interventions, and/or other suitable aspects of controlling the quantum hardware.

Example embodiments according to some aspects of the present disclosure can provide for a number of technical effects and benefits, such as improvements to computing technology (e.g., quantum computing technology). For instance, utilizing a scalability model to evaluate candidate quantum computing system architectures at scales for implementing practical quantum algorithms can provide accurate evaluation of those candidate architectures while avoiding costs associated with constructing large-scale quantum computing systems. Additionally or alternatively, the use of scalability models can conserve computational resources associated with simulating large-scale quantum computing systems and/or provide for evaluation of systems that are computationally intractable to simulate. Furthermore, example aspects of the present disclosure can provide for designing and/or implementing quantum computing system architectures that have improved scalability. This, in turn, can provide for improved performance of the quantum computing systems, such as reduced gate errors.

With reference now to the Figures, example embodiments of the present disclosure will be discussed in further detail.

FIG. 1 depicts an example quantum computing system 100. The example system 100 is an example of a system on one or more classical computers or quantum computing devices in one or more locations, in which the systems, components, and techniques described below can be implemented. Those of ordinary skill in the art, using the disclosures provided herein, will understand that other quantum computing structures or systems can be used without deviating from the scope of the present disclosure.

The system 100 includes quantum hardware 102 in data communication with one or more classical processors 104. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits. In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

The readout device(s) 114 can take advantage of a difference in the impedance for the $|0\rangle$ and $|1\rangle$ states of an element of the quantum system, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

In some implementations, the quantum system 110 can include a plurality of qubits 120 arranged, for instance, in a two-dimensional grid 122. For clarity, the two-dimensional grid 122 depicted in FIG. 1 includes 16 qubits arranged in a square formation, however in some implementations the system 110 may include a smaller or a larger number of qubits. In some embodiments, the multiple qubits 120 can interact with each other through multiple qubit couplers, e.g., qubit coupler 124. The qubit couplers can define nearest neighbor interactions between the multiple qubits 120. In some implementations, the strengths of the multiple qubit couplers are tunable parameters. In some cases, the multiple qubit couplers included in the quantum computing system 100 may be couplers with a fixed coupling strength. In some implementations, the multiple qubits 120 may include data qubits, such as qubit 126 and measurement qubits, such as qubit 128. A data qubit is a qubit that participates in a computation being performed by the system 100. A measurement qubit is a qubit that may be used to determine an outcome of a computation performed by the data qubit. That is, during a computation an unknown state of the data qubit is transferred to the measurement qubit using a suitable physical operation and measured via a suitable measurement operation performed on the measurement qubit.

In some implementations, each qubit in the multiple qubits 120 can be operated using respective operating frequencies, such as an idling frequency and/or an interaction frequency and/or readout frequency and/or reset frequency. The operating frequencies can vary from qubit to qubit. For instance, each qubit may idle at a different operating frequency. The operating frequencies for the qubits 120 can be chosen before a computation is performed by the calibration system. Some operating frequencies are better than other operating frequencies. One metric for assessing how good a particular operating frequency is for a particular qubit is energy relaxation time (T1) for the qubit at the frequency. Lower energy relaxation times can lead to larger quantum computational errors.

In various implementations, the example system 100 can be implemented as a client device, a server device, or both. The example system 100 can be implemented as part of a distributed computing system. The example system 100 can be implemented along with other example systems, which may be the same or different. The example system 100 can be implemented in a server farm or other facility that operates multiple computing systems to provide computational services to or on behalf of a plurality of client systems. Advantageously, techniques according to example aspects of the present disclosure can provide for improved calibration and maintenance of computing facilities, increasing service uptime, decreasing failure rates, etc.

Figure 2:
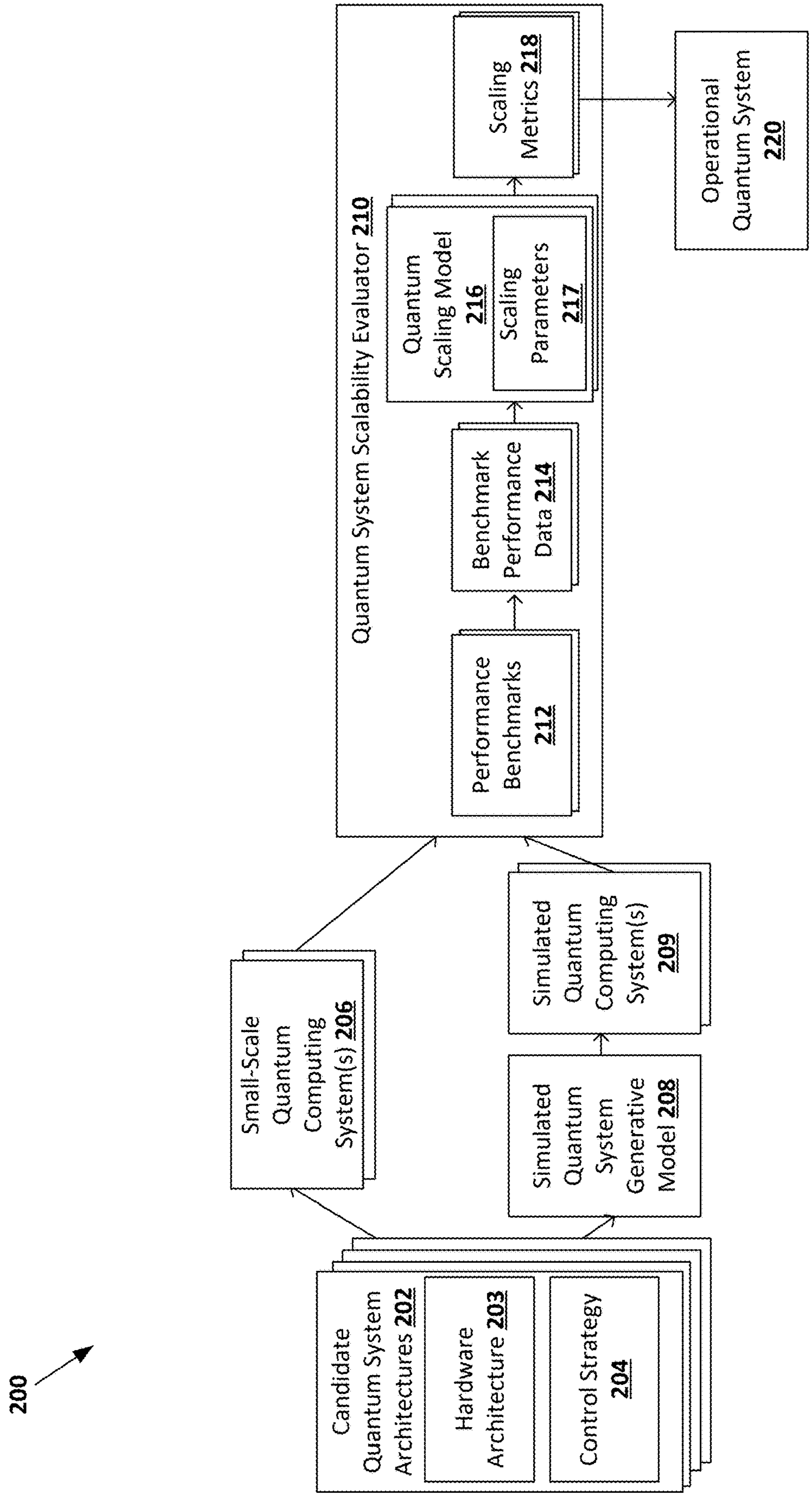
FIG. 2 depicts a diagram of an example system for evaluating scalability of candidate quantum system architecture according to aspects of the present disclosure.

FIG. 2 depicts a diagram of an example system 200 for evaluating scalability of candidate quantum system architecture according to aspects of the present disclosure. The system 200 can be configured to evaluate one or more candidate quantum system architectures 202. Each of the candidate quantum system architectures 202 can specify, represent, or otherwise define a distinct configuration of quantum computing system. Each candidate quantum system architecture 202 can specify a quantum hardware architecture 203 and a control strategy 204.

The system 200 can select the candidate quantum system architecture(s) 202 for which scalability is to be evaluated. For instance, in some implementations, evaluating scalability of a candidate quantum system architecture 202 can include selecting a hardware architecture 203 of the candidate quantum system architecture 202 and/or selecting a control strategy 204 of the candidate quantum system architecture 202. In some implementations, a user (e.g., a quantum programmer or quantum system designer) may manually select the hardware architecture 203 and/or control strategy 204 to be tested. Additionally or alternatively, in some implementations, the hardware architecture 203 and/or the control strategy 204 can be selected iteratively or automatically. For instance, in some implementations, the candidate quantum system architecture(s) 202 can be selected and/or tested regularly as an optimization loop used to progressively improve the scalability of a quantum computing system over time. For instance, the system 200 can repeatedly test variable hardware architectures 203 and/or control strategies 204 to optimize relevant scaling metrics and/or algorithms in deployment.

The hardware architecture 204 of the candidate quantum system architecture 202 cam define or specify structural characteristics of the candidate quantum system architecture 202 (e.g., one or more qubits of the candidate quantum system architecture 202). The structural characteristics can relate to aspects of the candidate quantum system architecture 202 that are fixed for a given type and/or architecture of qubits, such as, for example, qubit type characteristics, qubit arrangement characteristics, control signal line arrangement characteristics, fabrication characteristics, and/or dependency characteristics. Example structural characteristics can include, but are not limited to, capacitance (e.g., self-capacitance), Josephson junction resistance, qubit anharmonicity, qubit-control mutual inductance distribution, maximum frequency, readout-resonator frequency, Josephson-junction asymmetry, two-level-system (TLS) TLS number density, TLS frequency, TLS coherence, TLS qubit-decoupling, qubit quality, qubit-control mutual inductance prime distribution, drive impedance, resonator internal quality, resonator coupling quality, resonator-qubit coupling efficiency, bandpass filter frequency, bandpass filter quality, transmon frequency, T1 spectrum, single qubit frequency, or qubit grid frequency.

The control strategy 204 can define or specify operational characteristics of the candidate quantum system architecture 202 (e.g., one or more qubits of the candidate quantum system architecture 202). For instance, the control strategy 204 can include data descriptive of operational characteristics of classical or quantum hardware of quantum computing system 100, such as qubit operational characteristics (e.g., including qubits and qubit couplers) and readout resonator characteristics. Additionally or alternatively, the control strategy 204 can be indicative of one or more calibration interventions or one or more optimization interventions. Calibration interventions can provide or can describe instructions for calibrating one or more aspects of a quantum computing system. Different calibration interventions can reflect or embody different strategies for calibration, such as by manipulating different parameters, implementing a different timetable for adjusting parameters, determining whether to intervene at all, etc. For instance, different calibration interventions can be configured with different responses to a given set of input features. For instance, threshold-based heuristics can be configured with different trigger points (e.g., for identifying components with outlier characteristics). For instance, for a given quantum system architecture 202 descriptive of a number of qubits, different calibration models can identify different qubits for calibration, different gate frequencies to adjust, or other different operational characteristics to calibrate.

The operational characteristics can include data descriptive of both controlled and/or uncontrolled characteristics. As one example, operational characteristics of the one or more qubits can include one or more operating frequencies of qubits in the candidate quantum system architecture 202. As another example, the operational characteristics can include data descriptive of environmental conditions or other characteristics that are not or cannot be directly controlled. As further examples, the operational characteristics can include one or more of single qubit gate frequency trajectories, two qubit gate frequency trajectories, readout frequency trajectories, maximum/minimum operating frequencies, anharmonicity of frequencies, bias voltage, coupling efficiency, Ramsey coherence time, spin-echo coherence time, CPMG dephasing time, energy-relaxation time, Rabi oscillations, pulse amplitude, pulse length, pulse frequency, single-qubit randomized benchmarking (RB) error, single-qubit cross-entropy benchmarking (XEB) error, two-qubit RB error, two-qubit XEB error, or two-qubit XEB purity error.

Example quantum systems can be designed, constructed, and/or simulated based on the candidate quantum system architecture 202 for the purpose of generating benchmark performance data 216 representative of performance of those systems at varying numbers of qubits. For example, a small-scale quantum computing system 206 can be designed and/or constructed based on a candidate quantum system architecture 202. The small-scale quantum computing system(s) 206 can be physical (e.g., real-world) quantum computing systems constructed according to the candidate quantum system architecture such that the systems 206 can perform quantum gate operations. The small-scale quantum computing systems 206 can include one or more qubits, but may include only a limited number of qubits (e.g., less than 10 qubits, less than 20 qubits, etc.).

Additionally or alternatively, a simulated quantum computing system 209 can be produced by one or more simulated quantum system generative models 208. The simulated quantum computing system 209 can be or can include data, models, or other virtual (e.g., in classical computing) representations of a quantum computing system according to the candidate quantum system architecture 202. For instance, in one example, parameters of the candidate quantum system architecture 202 can be input to the simulated quantum system generative model 208, which is configured to produce samples of quantum hardware (e.g., quantum processors) according to the architecture 202.

In one example implementation, the simulated quantum system generative model 208 is configured to model a statistical distribution of quantum systems according to the parameters specified by the architecture 202, such as manufacturing variations, operational variations, and so on. For instance, the simulated quantum system generative model 208 can model quantum hardware parameter distributions such as circuit parameters, one or more electrical parameters, one or more fabrication parameters, or one or more defect parameters. The quantum hardware parameter distributions, in some implementations, can include at least one of a qubit distribution, qubit circuit distribution, qubit relaxation distribution, or background loss distribution. In some implementations, the one or more quantum hardware parameter distributions can include at least one of capacitance (e.g., qubit self-capacitance), junction resistance (e.g., Josephson junction resistance), qubit anharmonicity, qubit-control mutual inductance distribution, maximum frequency, readout-resonator frequency, Josephson-junction asymmetry, two-level-system (TLS) TLS number density, TLS frequency, TLS coherence, TLS qubit-decoupling, qubit quality, qubit-control mutual inductance prime distribution, drive impedance, resonator internal quality, resonator coupling quality, resonator-qubit coupling efficiency, bandpass filter frequency, bandpass filter quality, transmon frequency, T1 spectrum, single qubit frequency, or qubit grid frequency. In some implementations, the simulated quantum system generative model 208 can be or can include a joint probability distribution over the quantum hardware parameter distributions.

In some implementations, the quantum hardware parameter distributions can be "simple distributions" that return one or more numbers corresponding to some parameter of quantum hardware, such as circuit parameters, fabrication parameters, TLS, etc. a quantum hardware parameter distribution can be sampled to produce a parameter distribution sample. The distribution sample can be propagated through the simulated quantum system generative model 208 (e.g., by a statistical network). For instance, an example Josephson junction resistance distribution of example quantum hardware parameter distribution can be sampled to produce a resistance value in a parameter distribution sample. The resistance value in parameter distribution sample can be indicative of a Josephson junction resistance for an example quantum hardware sample, such as an example quantum hardware sample produced by propagating the parameter distribution sample through simulated quantum system generative model 208. Additionally or alternatively, the simulated quantum system generative model 208 can learn and/or otherwise model dependencies in quantum hardware to simulate operation of a real quantum computing system.

The quantum system scalability evaluator 210 can determine one or more performance benchmarks 212. The performance benchmarks 212 can establish test conditions for a given quantum system to evaluate how well that quantum system performs relative to other quantum systems. The performance benchmarks 212 may be designed to measure one or more performance characteristics of a quantum system. For instance, the performance characteristics may be or may include gate errors.

In some implementations, the performance benchmarks 212 may be designed respective to a given quantum algorithm of interest. For instance, the performance benchmarks 212 may be selected to be representative of the quantum algorithm. As one example, the quantum system scalability evaluator 210 can select a quantum algorithm and, subsequently, select one or more performance benchmarks 212 to be representative of the quantum algorithm.

The quantum system scalability evaluator 210 can obtain benchmark performance data 214. The benchmark performance data 214 can be obtained respective to a candidate quantum system architecture 202. For instance, performance of the small-scale quantum computing system 206 and/or simulated quantum computing system 209 configured according to the quantum system architecture 202 can be measured using the performance benchmarks 212 to produce the benchmark performance data 214. The benchmark performance data 214 can be descriptive of one or more performance characteristics of the candidate quantum system architecture. For instance, the performance characteristics can be or can include gate errors, and the benchmark performance data 214 can be gate error benchmark performance data.

Furthermore, the benchmark performance data 214 can be obtained a for a plurality of processor sizes of the candidate quantum system architecture 202. As used herein, processor size refers to the number of qubits in the processor. For instance, the small-scale quantum computing systems 206 and/or simulated quantum computing systems 209 can be designed and/or simulated for a plurality of processor sizes. Each processor size can include a number of qubits in a quantum processor of the quantum systems 206, 209. For instance, the quantum systems 206, 209 may be tested having variable number of qubits to evaluate how performance of the quantum systems 206, 209 is affected as the systems 206, 209 scale in processor size. As one example, the systems 206, 209 may be evaluated at a plurality of processor sizes ranging from a first number of qubits (e.g., one qubit, two qubits, etc.) to a second number of qubits (e.g., ten qubits). Although the systems 206, 209 may be tested at a variable number of qubits to evaluable scalability, the systems 206, 209 may have a fewer number of qubits than a number of qubits for implementing practical quantum algorithms, such as greater than about 20 qubits.

The quantum system scalability evaluator 210 can obtain a quantum scaling model 216 including one or more scaling parameters 217 based on the benchmark performance data 214 For instance, the quantum scaling parameters 217 can define the quantum scaling model 216. The quantum scaling model 216 can relate processor size of the candidate quantum system architecture 202 to the one or more performance characteristics of the candidate quantum system architecture 202. For instance, the quantum scaling model 216 can define how performance of a quantum computing system according to the quantum system architecture 202 (e.g., the systems 206, 209) changes as processor size increases. The quantum scaling model 216 can be an algebraic model, such as an equation including a plurality of scaling parameters 217, one or more independent variables (e.g., a number of qubits), and/or one or more dependent variables (e.g., performance characteristics such as gate error).

For instance, one example quantum scaling model 216 includes scaling parameters 217 such as a qubit saturation constant, a saturated gate error, and a scaling logic error penalty. The qubit saturation constant represents a number of qubits beyond which significant performance degradation is not expected as the number of qubits increases. The saturated gate error represents the limit of performance degradation as the number of qubits increases. For instance, the quantum system will generally reach a gate error at or about the saturated gate error when the number of qubits of the quantum system increases beyond the qubit saturation constant. Additionally, the scaling logic error penalty represents the penalty in scaling logic from relatively smaller systems to relatively larger systems. In particular, one example quantum scaling model 216 relates an average gate error at a number of qubits to a quantity comprising the scaling logic error penalty multiplied by the exponential number of qubits divided by the qubit saturation constant, the quantity subtracted from the saturated gate error. For instance, an example quantum scaling model 216 can be represented by:

$$r(n_q) = r_{sat} - r_{scale} * e^{\frac{-n_q}{n_{sat}}}$$

where $n_q$ is the number of qubits $r(n_q)$ is the average gate error at $n_q$ qubits, $r_{sat}$ is the saturated gate error, $r_{scale}$ is the scaling logic error penalty, and $n_{sat}$ is the qubit saturation constant. Although this model is relatively mathematically simple, it can apply to a wide array of practical scenarios and model scalability of even relatively complex quantum computing systems. In particular, these parameters can embed even the complex interplay between multiple degradation sources.

In some implementations, obtaining the one or more quantum scaling parameters 217 can include fitting the quantum scaling model 216 to the benchmark performance data 214. For instance, the quantum scaling model 216 can be an algorithmic model of performance that can be tuned by adjusting values of the one or more quantum scaling parameters 217. The quantum scaling model 216 can be fit to the benchmark performance data 214 by any suitable curve-fitting algorithm, such as, for example, regression algorithms, least-squares algorithms, or other suitable algorithms, to determine values of the one or more quantum scaling parameters 217 that cause the quantum scaling model 216 to generally fit the benchmark performance data 214.

Figure 3:
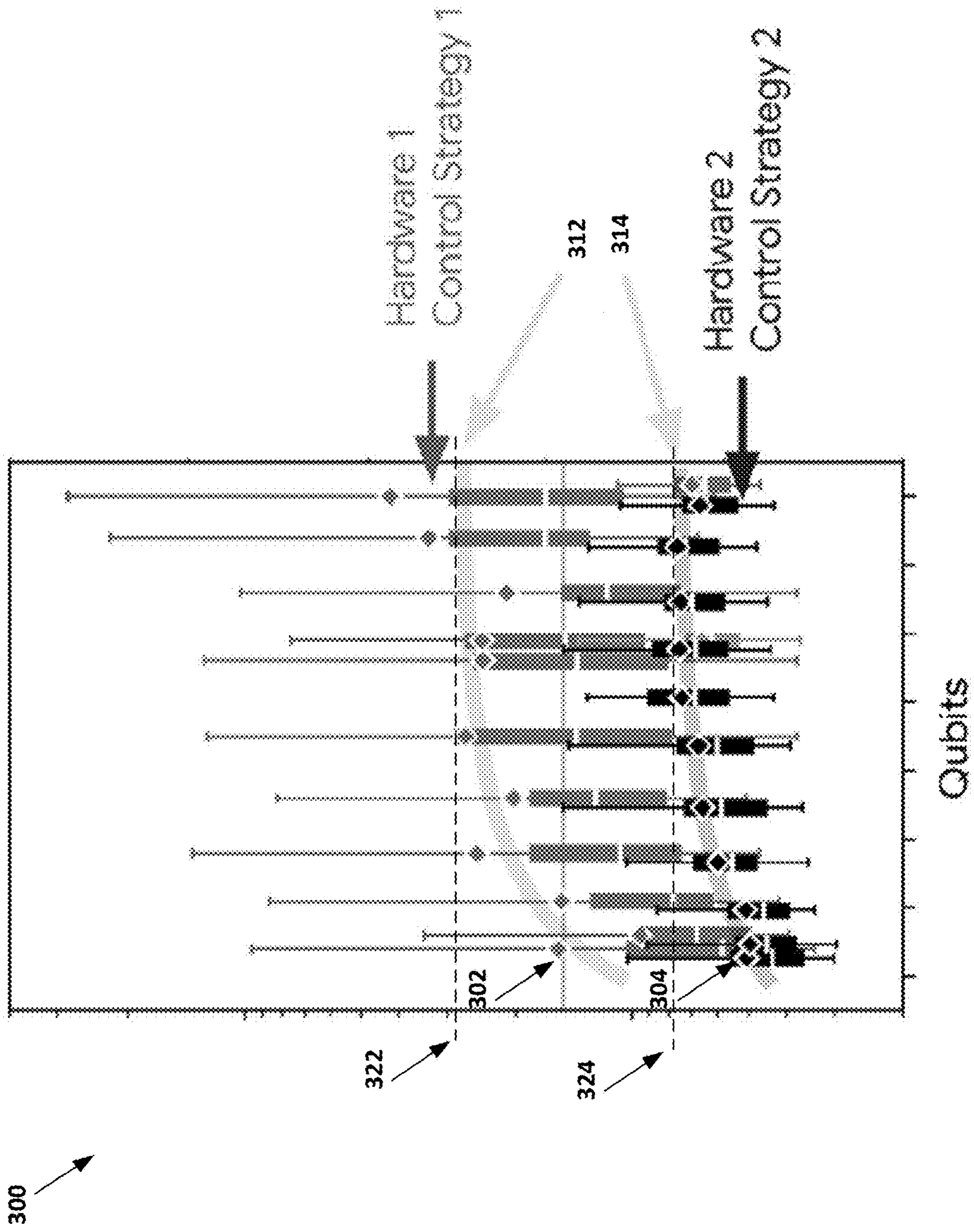
FIG. 3 depicts a plot of an example of benchmark performance data with respective scaling models for a given performance benchmark according to aspects of the present disclosure.

An example of benchmark performance data 214 with respective scaling models 216 for a given performance benchmark 212 is illustrated in plot 300 of FIG. 3. The plot 300 includes first benchmark performance data 302 according to a first quantum hardware architecture and a first control strategy and second benchmark performance data 304 according to a second quantum hardware architecture and/or a second control strategy. Additionally, a first scaling model 312 is fit to the first benchmark performance data 302 and a second scaling model 314 is fit to the second benchmark performance data 304. In the plot 300, the x-axis denotes an increasing number of qubits and the y-axis denotes performance on a performance benchmark. For instance, the y-axis can denote a number of gate errors at a given number of qubits for a given candidate quantum system architecture.

As illustrated in FIG. 3, the performance of a given candidate quantum system architecture can generally follow a curve represented by the scaling models 312, 314. Furthermore, the performance of the quantum system architecture can generally saturate at a level denoted by the saturated gate errors 322, 324. The saturated gate errors 322 and 324 can represent the amount of gate errors that the performance of the quantum systems trend towards as the number of qubits increase. Generally, it can be desirable to select a quantum system having a lower saturated gate error than a higher saturated gate error, as the quantum system having a lower saturated gate error can provide reduced gate errors during performance of a practical quantum algorithm. By comparing the scaling models 312, 314 (e.g., the saturated gate errors 322, 324), it can be possible to evaluate the performance of a given candidate quantum architecture at large numbers of qubits.

Returning to FIG. 2, the quantum system scalability evaluator 210 can determine one or more scaling metrics 218 for the candidate quantum system architecture 202 by the quantum scaling model 216. In particular, the scaling metrics 218 can be or can include performance of quantum systems according to the candidate quantum system architecture 202 at a scaled processor size greater than the plurality of processor sizes that were used to obtain the quantum scaling model 216. For instance, the quantum system scalability evaluator 210 can extrapolate performance of quantum systems according to the architecture(s) 202 at processor sizes far greater than the quantum computing systems 206, 209 using the quantum scaling model 216. As one example, the scaled processor size can be provided as input to the quantum scaling model 216. The scaling metrics 218 can be the output of the scaling model 216 in response to receiving the scaled processor size as input. The scaling metrics 218 may be predicted benchmark performance data for the candidate quantum system architecture at the scaled processor size. Additionally or alternatively, in some implementations, the scaling metrics 218 can be some or all the quantum scaling parameters 217 themselves (e.g., the saturated gate errors). Additionally or alternatively, in some implementations, the scaling metrics 218 can include data descriptive of a comparison of quantum scaling model(s) 216 and/or its outputs for multiple candidate quantum system architectures.

The system 200 can determine one or more control actions for an operational quantum system 220 based on the one or more scaling metrics 218. For instance, in some implementations, if the system 200 identifies a candidate quantum system architecture 202 having improved scalability, the operational quantum system 220 can be configured according to that architecture 202. For instance, in some implementations, determining the one or more control actions can implementing one or more operational characteristics of the candidate quantum system architecture 202 in the operational quantum system 220.

Additionally or alternatively, the system 200 can compare scaling metrics 218 for two or more candidate quantum system architectures 202 to configure the operational quantum system 220 according to an architecture 202 providing improved scalability. For instance, in some implementations, the quantum system scalability evaluator 210 can obtain second benchmark performance data for a second candidate quantum system architecture; obtain one or more second scaling parameters based on the second benchmark performance data; determine one or more second scaling metrics for the second candidate quantum system architecture based on the one or more second scaling parameters; and compare the one or more scaling metrics to the one or more second scaling metrics. Based on the comparison, the system 200 and/or a user can select one of the candidate quantum system architecture or the second quantum system. The operational quantum system 220 can be configured according to one or more operational characteristics of the selected one of the candidate quantum system architecture or the second candidate quantum system architecture. For instance, the operational quantum system 220 can be configured according to a candidate quantum system architecture providing improved scalability.

Furthermore, in some implementations, the scaling metrics 218 and/or the scaling model 216 can be used to modify future design and development of quantum processors. For instance, test quantum processors can be repeatedly designed, fabricated, benchmarked, and revised. It can be desirable to improve the speed and/or reduce the cost at which these processes are performed to reduce resources dedicated to future development. To facilitate this, it can be beneficial to use smaller quantum processors. The scaling metrics 218 and/or the scaling model 216 can inform an adequate size of test processors that capture scalability of quantum processors. For example, if several given quantum computing systems saturate at a nearly common qubit saturation constant, future test quantum systems may be tested up to that common qubit saturation constant (or some small multiple, such as two or three times that qubit saturation constant) to limit the scale of future test processors without compromising scalability testing.

Figure 4:
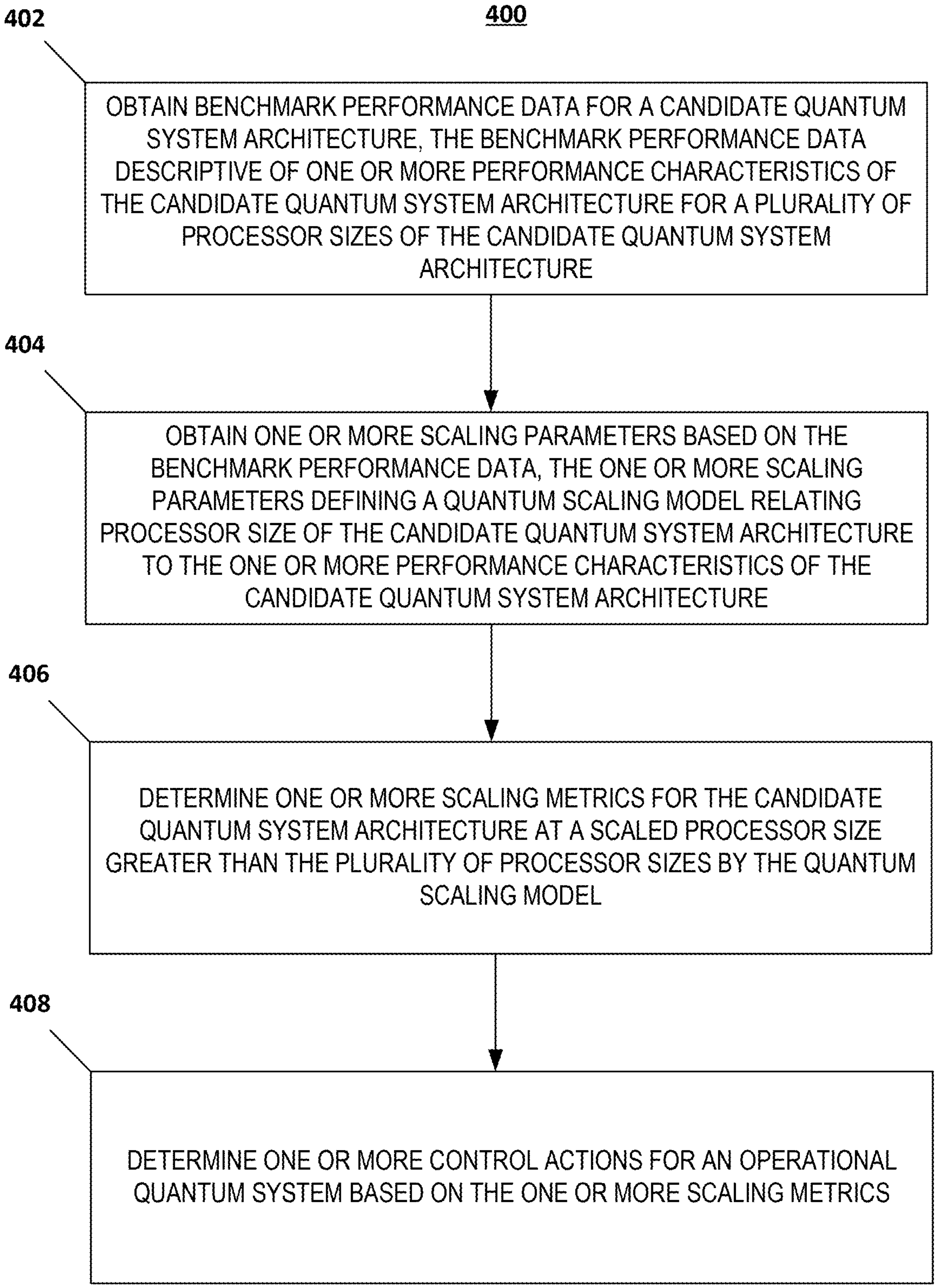
FIG. 4 depicts a flow chart diagram of an example method for evaluating scalability of a candidate quantum system architecture according to example aspects of the present disclosure.

FIG. 4 depicts a flowchart of a method 400 for evaluating scalability of quantum systems according to aspects of the present disclosure. One or more portion(s) of the method 400 can be implemented by a computing system that includes one or more computing devices such as, for example, the computing systems described with reference to the other figures (e.g., systems and devices of FIG. 1, 2, 5A-5C, etc.). Each respective portion of the method 400 can be performed by any (or any combination) of one or more computing devices. Moreover, one or more portion(s) of the method 400 can be implemented on the hardware components of the device(s) described herein. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 4 is described with reference to elements/terms described with respect to other systems and figures for exemplary illustrated purposes and is not meant to be limiting. One or more portions of method 400 can be performed additionally, or alternatively, by other systems.

At 402, method 400 can include obtaining one or more candidate quantum system architectures. Each of the candidate quantum system architectures can specify, represent, or otherwise define a distinct configuration of quantum computing system. Each candidate quantum system architecture can specify a quantum hardware architecture and a control strategy.

A system can select the candidate quantum system architecture(s) for which scalability is to be evaluated. For instance, in some implementations, evaluating scalability of a candidate quantum system architecture can include selecting a hardware architecture of the candidate quantum system architecture and/or selecting a control strategy of the candidate quantum system architecture. In some implementations, a user (e.g., a quantum programmer or quantum system designer) may manually select the hardware architecture and/or control strategy to be tested. Additionally or alternatively, in some implementations, the hardware architecture and/or the control strategy can be selected iteratively or automatically. For instance, in some implementations, the candidate quantum system architecture(s) can be selected and/or tested regularly as an optimization loop used to progressively improve the scalability of a quantum computing system over time. For instance, a system can repeatedly test variable hardware architectures and/or control strategies to optimize relevant scaling metrics and/or algorithms in deployment.

The hardware architecture of the candidate quantum system architecture cam define or specify structural characteristics of the candidate quantum system architecture (e.g., one or more qubits of the candidate quantum system architecture). The structural characteristics can relate to aspects of the candidate quantum system architecture that are fixed for a given type and/or architecture of qubits, such as, for example, qubit type characteristics, qubit arrangement characteristics, control signal line arrangement characteristics, fabrication characteristics, and/or dependency characteristics. Example structural characteristics can include, but are not limited to, capacitance (e.g., self-capacitance), Josephson junction resistance, qubit anharmonicity, qubit-control mutual inductance distribution, maximum frequency, readout-resonator frequency, Josephson-junction asymmetry, two-level-system (TLS) TLS number density, TLS frequency, TLS coherence, TLS qubit-decoupling, qubit quality, qubit-control mutual inductance prime distribution, drive impedance, resonator internal quality, resonator coupling quality, resonator-qubit coupling efficiency, bandpass filter frequency, bandpass filter quality, transmon frequency, T1 spectrum, single qubit frequency, or qubit grid frequency.

The control strategy can define or specify operational characteristics of the candidate quantum system architecture (e.g., one or more qubits of the candidate quantum system architecture). For instance, the control strategy can include data descriptive of operational characteristics of classical or quantum hardware of quantum computing system 100, such as qubit operational characteristics (e.g., including qubits and qubit couplers) and readout resonator characteristics. Additionally or alternatively, the control strategy can be indicative of one or more calibration interventions or one or more optimization interventions. Calibration interventions can provide or can describe instructions for calibrating one or more aspects of a quantum computing system. Different calibration interventions can reflect or embody different strategies for calibration, such as by manipulating different parameters, implementing a different timetable for adjusting parameters, determining whether to intervene at all, etc. For instance, different calibration interventions can be configured with different responses to a given set of input features. For instance, threshold-based heuristics can be configured with different trigger points (e.g., for identifying components with outlier characteristics). For instance, for a given quantum system architecture descriptive of a number of qubits, different calibration models can identify different qubits for calibration, different gate frequencies to adjust, or other different operational characteristics to calibrate.

The operational characteristics can include data descriptive of both controlled and/or uncontrolled characteristics. As one example, operational characteristics of the one or more qubits can include one or more operating frequencies of qubits in the candidate quantum system architecture. As another example, the operational characteristics can include data descriptive of environmental conditions or other characteristics that are not or cannot be directly controlled. As further examples, the operational characteristics can include one or more of single qubit gate frequency trajectories, two qubit gate frequency trajectories, readout frequency trajectories, maximum/minimum operating frequencies, anharmonicity of frequencies, bias voltage, coupling efficiency, Ramsey coherence time, spin-echo coherence time, CPMG dephasing time, energy-relaxation time, Rabi oscillations, pulse amplitude, pulse length, pulse frequency, single-qubit randomized benchmarking (RB) error, single-qubit cross-entropy benchmarking (XEB) error, two-qubit RB error, two-qubit XEB error, or two-qubit XEB purity error.

Example quantum systems can be designed, constructed, and/or simulated based on the candidate quantum system architecture for the purpose of generating benchmark performance data representative of performance of those systems at varying numbers of qubits. For example, a small-scale quantum computing system can be designed and/or constructed based on a candidate quantum system architecture. The small-scale quantum computing system(s) can be physical (e.g., real-world) quantum computing systems constructed according to the candidate quantum system architecture such that the systems can perform quantum gate operations. The small-scale quantum computing systems can include one or more qubits, but may include only a limited number of qubits (e.g., less than 10 qubits, less than qubits, etc.).

Additionally or alternatively, a simulated quantum computing system can be produced by one or more simulated quantum system generative models. The simulated quantum computing system can be or can include data, models, or other virtual (e.g., in classical computing) representations of a quantum computing system according to the candidate quantum system architecture. For instance, in one example, parameters of the candidate quantum system architecture can be input to the simulated quantum system generative model, which is configured to produce samples of quantum hardware (e.g., quantum processors) according to the architecture.

In one example implementation, the simulated quantum system generative model is configured to model a statistical distribution of quantum systems according to the parameters specified by the architecture, such as manufacturing variations, operational variations, and so on. For instance, the simulated quantum system generative model can model quantum hardware parameter distributions such as circuit parameters, one or more electrical parameters, one or more fabrication parameters, or one or more defect parameters. The quantum hardware parameter distributions, in some implementations, can include at least one of a qubit distribution, qubit circuit distribution, qubit relaxation distribution, or background loss distribution. In some implementations, the one or more quantum hardware parameter distributions can include at least one of capacitance (e.g., qubit self-capacitance), junction resistance (e.g., Josephson junction resistance), qubit anharmonicity, qubit-control mutual inductance distribution, maximum frequency, readout-resonator frequency, Josephson-junction asymmetry, two-level-system (TLS) TLS number density, TLS frequency, TLS coherence, TLS qubit-decoupling, qubit quality, qubit-control mutual inductance prime distribution, drive impedance, resonator internal quality, resonator coupling quality, resonator-qubit coupling efficiency, bandpass filter frequency, bandpass filter quality, transmon frequency, T1 spectrum, single qubit frequency, or qubit grid frequency. In some implementations, the simulated quantum system generative model can be or can include a joint probability distribution over the quantum hardware parameter distributions.

In some implementations, the quantum hardware parameter distributions can be "simple distributions" that return one or more numbers corresponding to some parameter of quantum hardware, such as circuit parameters, fabrication parameters, TLS, etc. a quantum hardware parameter distribution can be sampled to produce a parameter distribution sample. The distribution sample can be propagated through the simulated quantum system generative model (e.g., by a statistical network). For instance, an example Josephson junction resistance distribution of example quantum hardware parameter distribution can be sampled to produce a resistance value in a parameter distribution sample. The resistance value in parameter distribution sample can be indicative of a Josephson junction resistance for an example quantum hardware sample, such as an example quantum hardware sample produced by propagating the parameter distribution sample through simulated quantum system generative model. Additionally or alternatively, the simulated quantum system generative model can learn and/or otherwise model dependencies in quantum hardware to simulate operation of a real quantum computing system.

At 404, the method 400 can include obtaining benchmark performance data. The benchmark performance data can be obtained respective to a candidate quantum system architecture. In some implementations, obtaining benchmark performance data can include determining one or more performance benchmarks. The performance benchmarks can establish test conditions for a given quantum system to evaluate how well that quantum system performs relative to other quantum systems. The performance benchmarks may be designed to measure one or more performance characteristics of a quantum system. For instance, the performance characteristics may be or may include gate errors.

In some implementations, the performance benchmarks may be designed respective to a given quantum algorithm of interest. For instance, the performance benchmarks may be selected to be representative of the quantum algorithm. As one example, a system can select a quantum algorithm and, subsequently, select one or more performance benchmarks to be representative of the quantum algorithm. For instance, performance of the small-scale quantum computing system and/or simulated quantum computing system configured according to the quantum system architecture can be measured using the performance benchmarks to produce the benchmark performance data. The benchmark performance data can be descriptive of one or more performance characteristics of the candidate quantum system architecture. For instance, the performance characteristics can be or can include gate errors, and the benchmark performance data can be gate error benchmark performance data.

Furthermore, the benchmark performance data can be obtained a for a plurality of processor sizes of the candidate quantum system architecture. For instance, the small-scale quantum computing systems and/or simulated quantum computing systems can be designed and/or simulated for a plurality of processor sizes. Each processor size can include a number of qubits in a quantum processor of the quantum systems. For instance, the quantum systems, may be tested having variable number of qubits to evaluate how performance of the quantum systems, is affected as the systems scale in processor size. As one example, the systems may be evaluated at a plurality of processor sizes ranging from a first number of qubits (e.g., one qubit, two qubits, etc.) to a second number of qubits (e.g., ten qubits). Although the systems may be tested at a variable number of qubits to evaluable scalability, the systems may have a fewer number of qubits than a number of qubits for implementing practical quantum algorithms, such as greater than about qubits.

In some implementations, obtaining the one or more quantum scaling parameters can include determining a quantum scaling model including one or more scaling parameters based on the benchmark performance data. For instance, the quantum scaling parameters can define the quantum scaling model. The quantum scaling model can relate processor size of the candidate quantum system architecture to the one or more performance characteristics of the candidate quantum system architecture. For instance, the quantum scaling model can define how performance of a quantum computing system according to the quantum system architecture changes as processor size increases. The quantum scaling model can be an algebraic model, such as an equation including a plurality of scaling parameters, one or more independent variables (e.g., a number of qubits), and/or one or more dependent variables (e.g., performance characteristics such as gate error).

For instance, one example quantum scaling model includes scaling parameters such as a qubit saturation constant, a saturated gate error, and a scaling logic error penalty. The qubit saturation constant represents a number of qubits beyond which significant performance degradation is not expected as the number of qubits increases. The saturated gate error represents the limit of performance degradation as the number of qubits increases. For instance, the quantum system will generally reach a gate error at or about the saturated gate error when the number of qubits of the quantum system increases beyond the qubit saturation constant. Additionally, the scaling logic error penalty represents the penalty in scaling logic from relatively smaller systems to relatively larger systems. In particular, one example quantum scaling model relates an average gate error at a number of qubits to a quantity comprising the scaling logic error penalty multiplied by the exponential number of qubits divided by the qubit saturation constant, the quantity subtracted from the saturated gate error. For instance, an example quantum scaling model can be represented by:

$$r(n_q) = r_{sat} - r_{scale} * e^{\frac{-n_q}{n_{sat}}}$$

where $n_q$ is the number of qubits $r(n_q)$ is the average gate error at $n_q$ qubits, $r_{sat}$ is the saturated gate error, $r_{scale}$ is the scaling logic error penalty, and $n_{sat}$ is the qubit saturation constant. Although this model is relatively mathematically simple, it can apply to a wide array of practical scenarios and model scalability of even relatively complex quantum computing systems. In particular, these parameters can embed even the complex interplay between multiple degradation sources.

In some implementations, obtaining the one or more quantum scaling parameters can include fitting the quantum scaling model to the benchmark performance data. For instance, the quantum scaling model can be an algorithmic model of performance that can be tuned by adjusting values of the one or more quantum scaling parameters. The quantum scaling model can be fit to the benchmark performance data by any suitable curve-fitting algorithm, such as, for example, regression algorithms, least-squares algorithms, or other suitable algorithms, to determine values of the one or more quantum scaling parameters that cause the quantum scaling model to generally fit the benchmark performance data. One example of benchmark performance data with respective scaling models for a given performance benchmark is illustrated in plot 300 of FIG. 3.

At 406, the method 400 can include determining one or more scaling metrics for the candidate quantum system architecture by the quantum scaling model. In particular, the scaling metrics can be or can include performance of quantum systems according to the candidate quantum system architecture at a scaled processor size greater than the plurality of processor sizes that were used to obtain the quantum scaling model. For instance, determining the scaling metrics can include extrapolating performance of quantum systems according to the architecture(s) at processor sizes far greater than the quantum computing systems, using the quantum scaling model. As one example, the scaled processor size can be provided as input to the quantum scaling model. The scaling metrics can be output of the scaling model in response to receiving the scaled processor size as input. Additionally or alternatively, in some implementations, the scaling metrics can be some or all the quantum scaling parameters themselves (e.g., the saturated gate errors). Additionally or alternatively, in some implementations, the scaling metrics can include data descriptive of a comparison of quantum scaling model(s) and/or its outputs for multiple candidate quantum system architectures.

At 408, the method 400 can include determining one or more control actions for an operational quantum system based on the one or more scaling metrics. For instance, in some implementations, if a system identifies a candidate quantum system architecture having improved scalability, the operational quantum system can be configured according to that architecture. For instance, in some implementations, determining the one or more control actions can implementing one or more operational characteristics of the candidate quantum system architecture in the operational quantum system.

Additionally or alternatively, in some implementations, the method 400 can additionally include comparing scaling metrics for two or more candidate quantum system architectures to configure the operational quantum system according to an architecture providing improved scalability. For instance, in some implementations, the method 400 can additionally include obtaining second benchmark performance data for a second candidate quantum system architecture; obtaining one or more second scaling parameters based on the second benchmark performance data; determining one or more second scaling metrics for the second candidate quantum system architecture based on the one or more second scaling parameters; and comparing the one or more scaling metrics to the one or more second scaling metrics. Based on the comparison, a system and/or a user can select one of the candidate quantum system architecture or the second quantum system. The operational quantum system can be configured according to one or more operational characteristics of the selected one of the candidate quantum system architecture or the second candidate quantum system architecture. For instance, the operational quantum system can be configured according to a candidate quantum system architecture providing improved scalability.

Figure 5A:
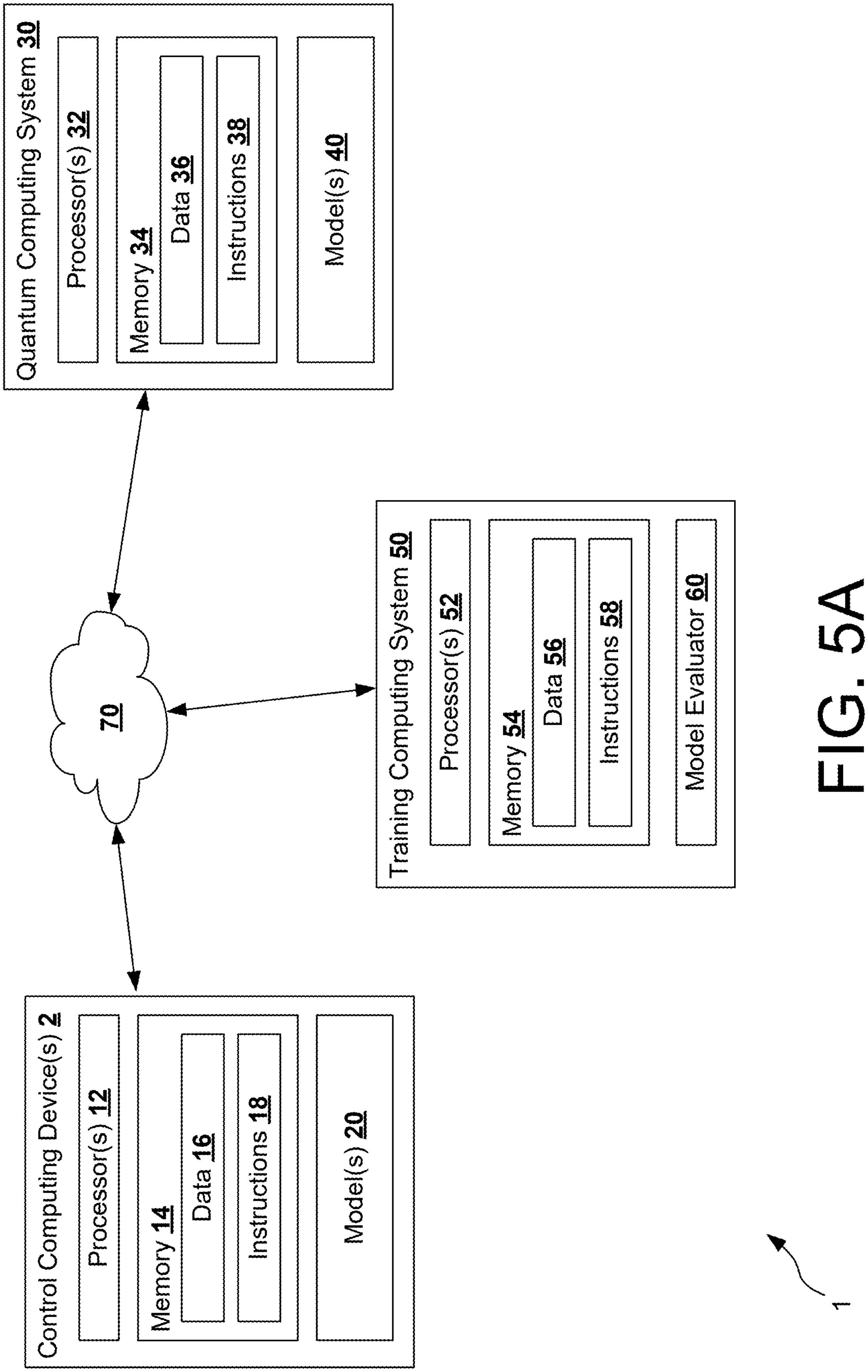
FIG. 5A depicts a block diagram of an example computing system for implementing calibration model evaluation according to example aspects of the present disclosure.

FIG. 5A depicts a block diagram of an example computing system 1 that can perform aspects of example embodiments of the present disclosure. The system 1 includes a control computing device 2, a quantum computing system 30, and a training computing system 50 that are communicatively coupled over a network 70.

The control computing device 2 can be any type of computing device (e.g., classical computing device), such as, for example, a mobile computing device (e.g., smartphone or tablet), a personal computing device (e.g., laptop or desktop), a workstation, a cluster, a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations as described herein.

In some implementations, the control computing device 2 can store or include one or more models 20. The model(s) 20 can be calibration models for calibrating one or more portions of the quantum computing system 20 (e.g., qubits, etc.). For example, the models 20 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, one or more models 20 can be transmitted to or received from the quantum computing system 30 over network 70, stored in the computing device memory 14, and used or otherwise implemented by the one or more processors 12. In some implementations, the computing device 2 can implement multiple parallel instances of model(s) 20.

Additionally, or alternatively, one or more models 40 can be included in or otherwise stored and implemented by the quantum computing system 30 that communicates with the computing device 2. For example, the models 40 can be implemented by the quantum computing system 40 for calibrating the quantum computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The quantum computing system 30 can include one or more processors 32 (e.g., classical processor(s) 104) and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations as described herein.

The quantum computing system 30 can also include quantum hardware 102, described above with reference to FIG. 1, for performing quantum computations.

In some implementations, the quantum computing system 30 includes or is otherwise implemented by one or more server computing devices. In instances in which the quantum computing system 30 includes plural server computing devices, such server computing devices can operate according to sequential computing architectures, parallel computing architectures, or some combination thereof.

As described above, the quantum computing system 30 can store or otherwise include one or more models 40. For example, the models 40 can be or can otherwise include various machine-learned models. Example machine-learned models include neural networks or other multi-layer nonlinear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The computing device 2 or the quantum computing system 30 can select, update, train, or otherwise iterate over example embodiments of a model (e.g., including models 20 or 40). In some embodiments, the computing device 2 or the quantum computing system 30 can train example embodiments of a machine-learned model (e.g., including models 20 or 40) via interaction with the training computing system 50. In some embodiments, the training computing system 50 can be communicatively coupled over the network 70. The training computing system 50 can be separate from the quantum computing system 30 or can be a portion of the quantum computing system 30 or the control computing device 2.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM. EEPROM, EPROM, flash memory devices, magnetic disks, etc., and combinations thereof. The memory 54 can store data 56 and instructions 58 which are executed by the processor 52 to cause the training computing system 50 to perform operations. In some implementations, the training computing system 50 includes or is otherwise implemented by one or more server computing devices.

Parameters of the model(s) can be trained, in some embodiments, using various training or learning techniques, such as, for example, backwards propagation of errors. For example, an objective or loss can be backpropagated through pretraining, general training, or finetuning pipeline(s) to update one or more parameters of the model(s) (e.g., based on a gradient of the loss function). Various determinations of loss can be used, such as mean squared error, likelihood loss, cross entropy loss, hinge loss, or various other loss functions. Gradient descent techniques can be used to iteratively update the parameters over a number of training iterations. In some implementations, performing backwards propagation of errors can include performing truncated backpropagation through time. The pipeline(s) can perform a number of generalization techniques (e.g., weight decays, dropouts, etc.) to improve the generalization capability of the models being trained.

The model trainer 60 can include computer logic utilized to provide desired functionality. The model trainer 60 can be implemented in hardware, firmware, or software controlling a general-purpose processor. For example, in some implementations, the model trainer 60 includes program files stored on a storage device, loaded into a memory, and executed by one or more processors. In other implementations, the model trainer 60 includes one or more sets of computer-executable instructions that are stored in a tangible computer-readable storage medium such as RAM, hard disk, or optical or magnetic media.

The network 70 can be any type of communications network (e.g., classical or quantum), such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 5A illustrates one example computing system that can be used to implement the present disclosure. Other computing systems can be used as well. For example, in some implementations, the computing device 2 can include the model trainer 60. In such implementations, a training pipeline can be used locally at the computing device 2.

Figure 5B:
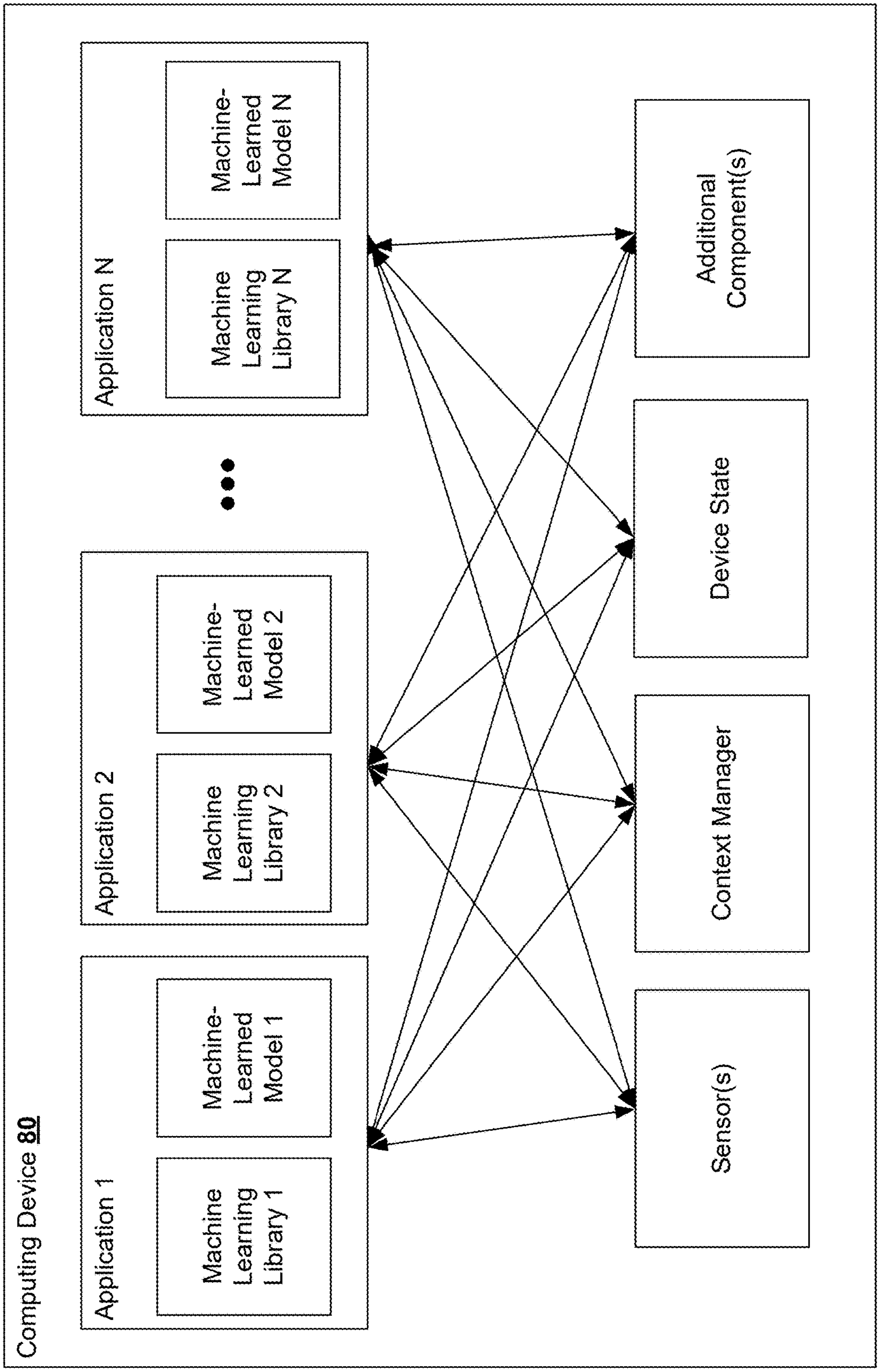
FIG. 5B depicts a block diagram of an example computing device for implementing calibration model evaluation according to example aspects of the present disclosure.

FIG. 5B depicts a block diagram of an example computing device 80 that performs according to example embodiments of the present disclosure. The computing device 80 can be a client computing device or a server computing device. The computing device 80 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 5B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 5C:
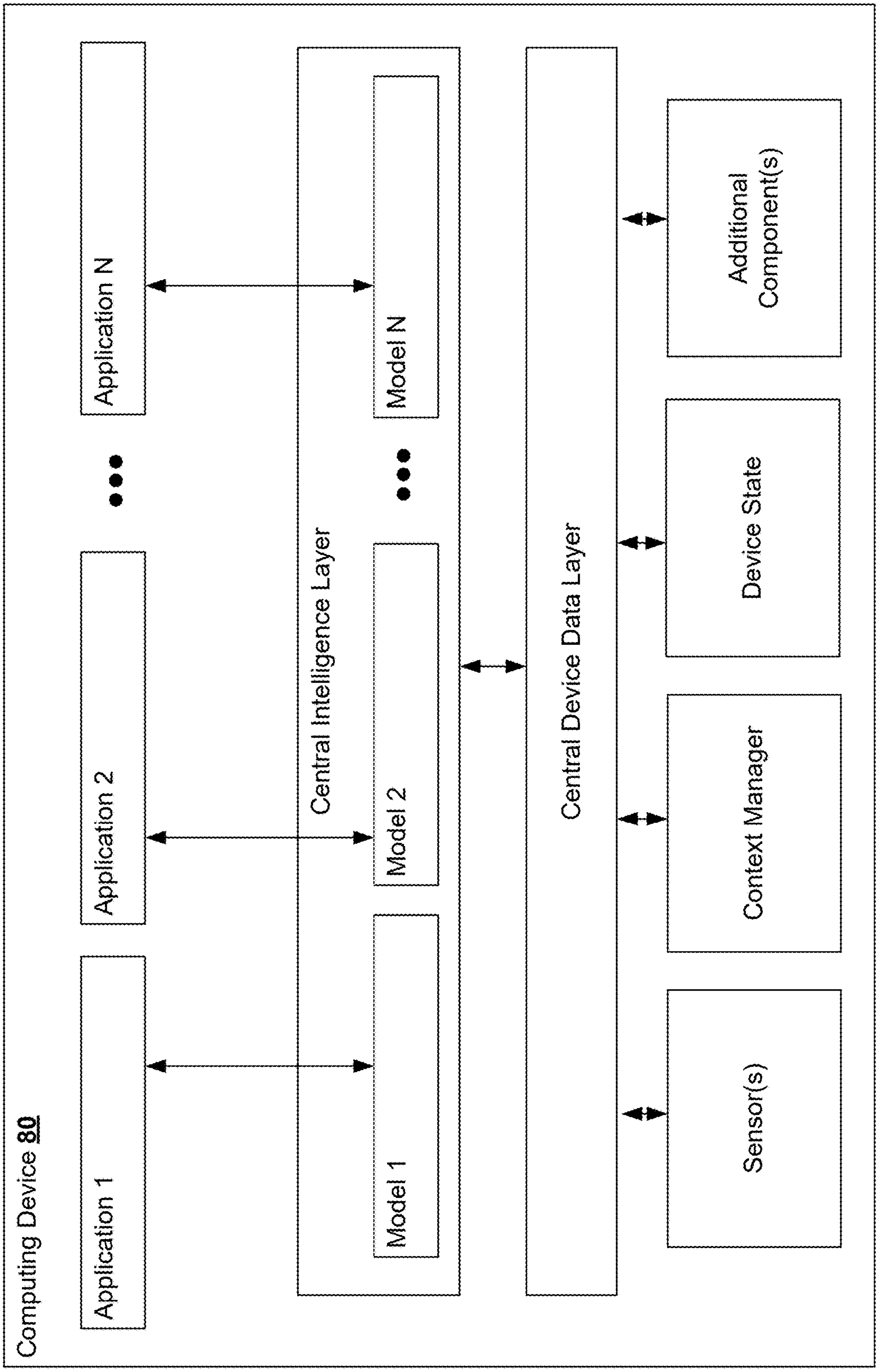
FIG. 5C depicts a block diagram of an example computing device for implementing calibration model evaluation according to example aspects of the present disclosure.

FIG. 5C depicts a block diagram of an example computing device 80 that performs according to example embodiments of the present disclosure. The computing device 80 can be a user computing device or a server computing device. The computing device 80 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 5C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 5C, the central device data layer can communicate with a number of other components of the computing device, such as, for example, one or more sensors, a context manager, a device state component, or additional components. In some implementations, the central device data layer can communicate with each device component using an API (e.g., a private API).

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs (e.g., one or more modules of digital and/or quantum computer program instructions encoded on a tangible non-transitory storage medium for execution by, or to control the operation of, data processing apparatus). The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit (i.e., a system that defines the unit of quantum information). It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qubits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A method for evaluating scalability of quantum systems, the method comprising:

obtaining benchmark performance data for a candidate quantum system architecture, the benchmark performance data descriptive of one or more performance characteristics of the candidate quantum system architecture for a plurality of processor sizes of the candidate quantum system architecture;

obtaining one or more scaling parameters based on the benchmark performance data, the one or more quantum scaling parameters comprising a quantum scaling model relating processor size of the candidate quantum system architecture to the one or more performance characteristics of the candidate quantum system architecture, wherein the one or more scaling parameters comprise a saturated error value indicative of a limit of performance degradation as the candidate quantum system architecture scales;

determining one or more scaling metrics for the candidate quantum system architecture at a scaled processor size greater than the plurality of processor sizes by the quantum scaling model; and determining one or more control actions for an operational quantum system based on the one or more scaling metrics.

2. The method of claim 1, wherein obtaining the benchmark performance data comprises:

selecting a quantum algorithm;

selecting one or more performance benchmarks to be representative of the quantum algorithm; and obtaining the benchmark performance data based on the one or more performance benchmarks.

3. The method of claim 1, wherein obtaining the benchmark performance data comprises:

selecting a hardware architecture of the candidate quantum system architecture, the hardware architecture of the candidate quantum system architecture defining structural characteristics of one or more qubits of the candidate quantum system architecture;

selecting a control strategy of the candidate quantum system architecture, the control strategy defining operational characteristics of the one or more qubits of the candidate quantum system architecture; and obtaining the benchmark performance data for the candidate quantum system architecture comprising the one or more qubits configured according to the hardware architecture and the control strategy.

4. The method of claim 3, wherein the structural characteristics of the one or more qubits comprise qubit type characteristics, qubit arrangement characteristics, control signal line arrangement characteristics, fabrication characteristics, and/or dependency characteristics.

5. The method of claim 3, wherein the structural characteristics of the one or more qubits comprise at least one of self-capacitance, junction resistance, qubit anharmonicity, qubit-control mutual inductance distribution, maximum frequency, readout-resonator frequency, Josephson-junction asymmetry, two-level-system (TLS) TLS number density, TLS frequency, TLS coherence, TLS qubit-decoupling, qubit quality, qubit-control mutual inductance prime distribution, drive impedance, resonator internal quality, resonator coupling quality, resonator-qubit coupling efficiency, bandpass filter frequency, bandpass filter quality, transmon frequency, T1 spectrum, single qubit frequency, or qubit grid frequency.

6. The method of claim 3, wherein the operational characteristics of the one or more qubits comprise one or more operating frequencies of the one or more qubits.

7. The method of claim 3, wherein the operational characteristics of the one or more qubits comprise one or more of single qubit gate frequency trajectories, two qubit gate frequency trajectories, readout frequency trajectories, maximum/minimum operating frequencies, anharmonicity of frequencies, bias voltage, coupling efficiency, Ramsey coherence time, spin-echo coherence time, CPMG dephasing time, energy-relaxation time, Rabi oscillations, pulse amplitude, pulse length, pulse frequency, single-qubit randomized benchmarking (RB) error, single-qubit cross-entropy benchmarking (XEB) error, two-qubit RB error, two-qubit XEB error, or two-qubit XEB purity error.

8. The method of claim 3, wherein the operational characteristics of the one or more qubits comprise one or more uncontrolled characteristics.

9. The method of claim 3, wherein the control strategy is indicative of one or more calibration interventions or one or more optimization interventions.

10. The method of claim 1, wherein the benchmark performance data comprises gate error benchmark performance data, and wherein the performance characteristics of the candidate quantum system architecture comprise gate errors.

11. The method of claim 1, wherein the one or more quantum scaling parameters further comprise a qubit saturation constant and a scaling logic error penalty.

12. The method of claim 11, wherein the quantum scaling model relates an average gate error at a number of qubits to a quantity comprising the scaling logic error penalty multiplied by an exponential number of qubits divided by the qubit saturation constant, the quantity subtracted from the saturated error value.

13. The method of claim 1, wherein obtaining the one or more quantum scaling parameters comprises fitting the quantum scaling model to the benchmark performance data.

14. The method of claim 1, wherein determining the one or more control actions comprises implementing one or more operational characteristics of the candidate quantum system architecture in an operational quantum system.

15. The method of claim 1, further comprising:

obtaining second benchmark performance data for a second candidate quantum system architecture;

obtaining one or more second scaling parameters based on the second benchmark performance data;

determining one or more second scaling metrics for the second candidate quantum system architecture based on the one or more second scaling parameters;

comparing the one or more scaling metrics to the one or more second scaling metrics and, based on the comparison, selecting one of the candidate quantum system architecture or the second quantum system; and configuring the operational quantum system according to one or more operational characteristics of the selected one of the candidate quantum system architecture or the second candidate quantum system architecture.

16. A quantum computing system, comprising:

quantum hardware;

one or more classical processors;

one or more non-transitory, computer-readable media storing instructions that, when implemented, cause the one or more classical processors to perform operations, the operations comprising:

obtaining benchmark performance data for a candidate quantum system architecture, the benchmark performance data descriptive of one or more performance characteristics of the candidate quantum system architecture for a plurality of processor sizes of the candidate quantum system architecture;

obtaining one or more scaling parameters based on the benchmark performance data, the one or more quantum scaling parameters comprising a scaling model relating processor size of the candidate quantum system architecture to the one or more performance characteristics of the candidate quantum system architecture, wherein the one or more scaling parameters comprise a saturated error value indicative of a limit of performance degradation as the candidate quantum system architecture scales;

determining one or more scaling metrics for the candidate quantum system architecture at a scaled processor size greater than the plurality of processor sizes by the scaling model; and determining one or more control actions for the quantum hardware based on the one or more scaling metrics.

17. The quantum computing system of claim 16, wherein obtaining the benchmark performance data comprises:

selecting a hardware architecture of the candidate quantum system architecture, the hardware architecture of the candidate quantum system architecture defining structural characteristics of one or more qubits of the candidate quantum system architecture;

selecting a control strategy of the candidate quantum system architecture, the control strategy defining operational characteristics of the one or more qubits of the candidate quantum system architecture; and obtaining the benchmark performance data for the candidate quantum system architecture comprising the one or more qubits configured according to the hardware architecture and the control strategy.

18. The quantum computing system of claim 16, wherein obtaining the one or more quantum scaling parameters comprises fitting the scaling model to the benchmark performance data.

19. The quantum computing system of claim 16, wherein the one or more quantum scaling parameters further comprise a qubit saturation constant and a scaling logic error penalty; and wherein the scaling model relates an average gate error at a number of qubits to a quantity comprising the scaling logic error penalty multiplied by an exponential number of qubits divided by the qubit saturation constant, the quantity subtracted from the saturated error value.

20. One or more non-transitory, computer-readable media storing instructions that, when implemented, cause one or more processors to perform operations, the operations comprising:

obtaining benchmark performance data for a candidate quantum system architecture, the benchmark performance data descriptive of one or more performance characteristics of the candidate quantum system architecture for a plurality of processor sizes of the candidate quantum system architecture;

obtaining one or more scaling parameters based on the benchmark performance data, the one or more quantum scaling parameters comprising a scaling model relating processor size of the candidate quantum system architecture to the one or more performance characteristics of the candidate quantum system architecture, wherein the one or more scaling parameters comprise a saturated error value indicative of a limit of performance degradation as the candidate quantum system architecture scales;

determining one or more scaling metrics for the candidate quantum system architecture at a scaled processor size greater than the plurality of processor sizes by the scaling model; and determining one or more control actions for an operational quantum system based on the one or more scaling metrics.

* * * * *